MAGNETRONS

Original Filed July 29, 1957

United States Patent Office

Re. 25,420
Reissued July 23, 1963

25,420
MAGNETRONS

James Rodney Mitchell Vaughan, Scotia, N.Y., and Robert Henry Bright, Stanwell, England, assignors to Electrical & Musical Industries Limited, Hayes, Middlesex, England, a company of Great Britain Original No. 2,894,171, dated July 7, 1959, Ser. No. 674,715, July 29, 1957. Application for reissue July 3, 1961, Ser. No. 125,031
Claims priority, application Great Britain Sept. 19, 1956
11 Claims. (Cl. 315—39.67)

Matter enclosed in heavy brackets [ ] appears in the original patent but forms no part of this reissue specification; matter printed in italics indicates the additions made by reissue.

This invention relates to magnetrons.

In a magnetron a cathode is disposed within a cylindrical anode, and when the magnetron is operated at very high powers, particularly at millimetre wavelengths, the centering of the cathode with respect to the anode is so critical that sufficient accuracy cannot be guaranteed by known assembly methods. It is desirable, therefore, that means should be provided for enabling small displacements of the cathode with respect to the [centre] *center* of the anode to be made during testing thereof following completion. Accordingly an object of the invention is to provide means for enabling such small displacements to be made.

According to the present invention there is provided a magnetron comprising a cathode disposed within an aperture in an anode, wherein said cathode is mounted at one end of an elongated support, which support is pivotably mounted about a point intermediate its ends and is provided near its end remote from said cathode with a collar having a part spherical outer surface which engages with a complementary spherical inner surface of an actuating member having a part spherical outer surface engaging a complementary surface in a bearing and wherein the [centre] *center* of curvature of the outer surface of said actuating member is not coincident with the [centre] *center* of curvature of the outer surface of said collar so that tilting of said actuating member with respect to the axis of said cathode support causes pivotal movement of said support thus enabling said cathode to be centered with respect to said aperture.

Suitable means may be provided for clamping said actuating member and thus the cathode in position after suitable adjustment of the position of the cathode has been made.

The actuating member may be tilted in the required direction to [centre] *center* said cathode by an adjusting member which may be sufficiently long that relatively coarse movements of the adjusting member cause fine movement to be made to the position of the cathode. The centering means can be sufficiently solidly constructed to prevent deformation due to the effects of vibration, pressure or other such deleterious influences.

Figure 1:
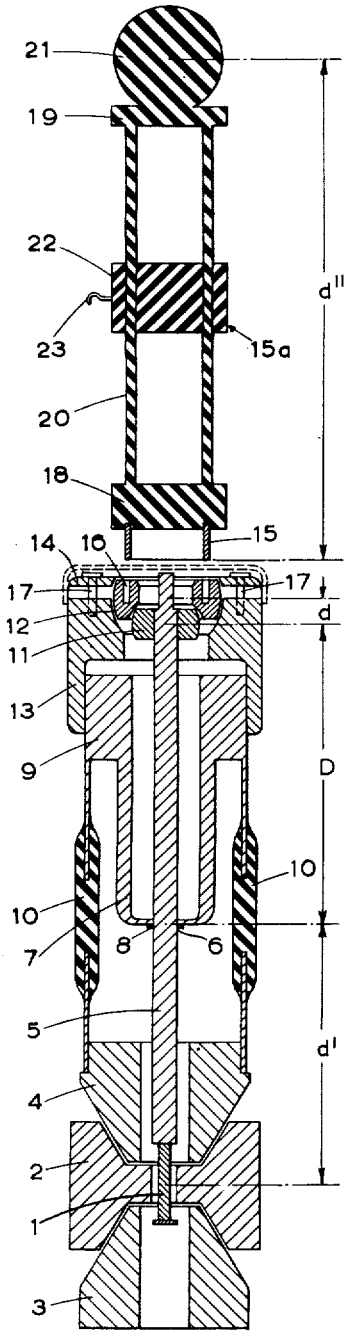
Figure 2:
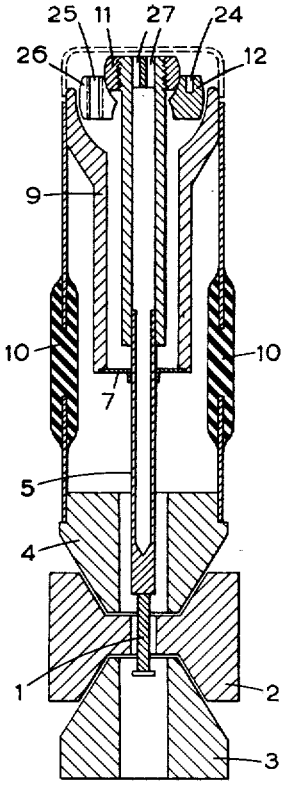
Figure 3:
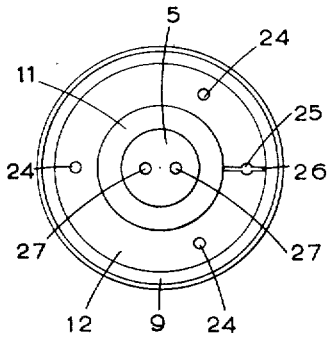

In order that the present invention may be clearly understood and readily carried into effect, the same will now be more fully described with reference to the accompanying drawings, in which:

FIGURE 1 shows a cross sectional view of a magnetron comprising means for centering the cathode with respect to the anode thereof in accordance with one embodiment of the invention, FIGURE 2 shows a cross sectional view of a magnetron comprising means for centering the cathode with respect to the anode thereof in accordance with another embodiment of the invention, and FIGURE 3 is an enlarged elevation of the right hand end of the magnetron shown in FIGURE 2.

Referring to the drawings there is shown a magnetron comprising a cathode 1 disposed substantially centrally in relation to an aperture in an anode 2, and pole pieces 3 and 4 to which will be coupled the usual magnet (not shown). It is required to effect fine adjustments to the position of the cathode after completion of the magnetron said adjustments being substantially perpendicular to the axis of the aperture in the anode 2 so that the [centre] *center* of the cathode can be accurately located on said axis. The cathode 1 is mounted at one end of an elongated support 5 which may be in the form of a rigid rod or tube, and the support 5 has a length which is large in comparison with the length of the cathode 1. The support 5 passes through an aperture 6 in a flat circular diaphragm 7 and is secured thereto by brazing or welding 8 so as to form a vacuum tight joint. The diaphragm 7 is slightly flexible so that the support 5 can pivot through a small angle about its point of contact with the diaphragm 7. The maximum displacement required at the cathode 1 is approximately only a few thousandths of an inch, and since the diaphragm 7 may be disposed approximately one inch from the cathode 1 the angular displacements of the cathode support 5 required are less than ½°. Hence the diaphragm 7 may be constructed from a plane metal sheet having a thickness of about .01 of an inch so that it permits small pivotal movements of the support 5 but remains substantially rigid in and perpendicular to the direction of the axis of the magnetron. The diaphragm 7 is secured to or forms an integral part of a fixed supporting member 9 which is rigidly secured to the pole piece 4 and the anode 2 via an insulating sleeve 10 provided in known manner to insulate the cathode 1 from the anode 2. The portion of the device between the cathode 1 and the diaphragm 7 is evacuated, and one end of the cathode support 5 is arranged to project outside the vacuum so that small transverse deflections may be applied to the projecting end to cause corresponding small transverse deflections of the cathode 1. The [centre] *center* of the cathode moves strictly on the surface of a sphere having its [centre] *center* at the point of pivoting, but since the required displacements of the cathode are very small the cathode may be considered to move substantially in a plane perpendicular to the axis of the aperture in the anode 2. Likewise the projecting end of the elongated support 5 may be considered to move in a plane parallel to the first mentioned plane. Near the projecting end of the support 5 there is mounted a collar 11 having a part spherical convex outer surface which engages with a complementary part-spherical concave inner surface of a ring shaped actuating member 12. The outer surface of the actuating member 12 is also part-spherical and has a radius of curvature larger than that of the outer surface of the collar 11 and engages with a complementary part-spherical bearing surface of a housing 13 which is secured to the supporting member 9. The said inner and outer surfaces of the actuating member 12 are so arranged that their [centres] *centers* of curvature are displaced relatively to one another along the axis of the magnetron. A clamping ring 14 is provided and is attached to the housing 13 by means of screws 17. The ring 14 has a part spherical surface which engages with, and is complementary to the spherical outer surface of the actuating member 12.

In order to [centre] *center* said cathode 1 the clamping ring 14 is initially screwed up to a position in which the actuating member 12 is in contact with the collar 11 and housing 13 but is just free to tilt about the axis of said cathode support 5. In this manner the [centre] *center* of curvature of the outer surface of the actuating member 12 is held in a fixed relationship relatively to the aperture in the anode 2, and if said member 12 is tilted in any direction about this [centre] *center*, the [centre] *center* of curvature of the inner surface thereof moves on the surface of a sphere. If, however, the movement of the actuating member 12 is confined to very small tilting movements from its original position the path of the [centre] *center* of its inner surface lies substantially in a plane perpendicular to the axis of the aperture in the anode 2. Since the inner surface of the actuating member 12 engages with the spherical outer surface of the collar 11 the latter, together with the projecting end of the cathode support 5 is also displaced substantially in a plane perpendicular to the axis of the device so that said support 5 pivots through a very small angle about the position of the diaphragm 7, and the cathode 3 is consequently displaced substantially in a plane perpendicular to the axis of the device. If D is the distance between the diaphragm 7 and the [centre] *center* of curvature of the inner surface of the actuating member 12, and d is the distance between the [centres] *centers* of curvature of the inner and outer surfaces of said actuating member 12 and if $\theta$ is the angle through which the rod 5 is deflected this will correspond to a deflection of the actuating member 12 through an angle equal to $$\frac{D\theta}{d}$$

The values of D and d may be of the order of one to two inches and one eighth of an inch respectively, and since the angle $\theta$ required is less than ½°, deflections of the actuating member required are less than 10°. Under such conditions the [centre] *center* of curvature of the inner surface of the actuating member 12 is displaced from the transverse plane through its reference position by less than .002 of an inch so that the path of said [centre] *center* may justifiably be deemed to lie in this plane.

The motion of the actuating member 12 may be imparted thereto by means of an adjusting member comprising a sleeve 15 which engages in an annular groove 16 in the actuating member 12. The sleeve 15 is mounted at one end of an insulating assembly 15a, comprising two insulating discs 18 and 19 joined together by a plurality of longitudinal insulated rods 20 of which two are shown in section in the drawing. The sleeve 15 may be mounted on the side of the disc 18 remote from said rods 20. A massive disc 22 is provided having suitable apertures therethrough through which said rods 20 pass so that the disc 22 is slidable on said rods 20, so that when suspended by a hook the adjusting member can be counterbalanced. The adjusting member is made sufficiently long so that coarse movement of the adjusting member effects fine movement of the actuating member.

If the distance between the [centres] *centers* of the cathode 1 and the diaphragm 7 is d′ and the length of the adjusting member is d″ then the ratio of the displacement of the handle 21 to that of the [centre] *center* of the cathode is $$\frac{d''}{d}\times\frac{D}{d'}$$

As previously stated d may be approximately one eighth of an inch whilst for purposes of adequate insulation d″ is made comparatively large, say of the order of twelve inches or more particularly as voltages of the order of 50,000 volts are required during testing. The ratio $$\frac{D}{d'}$$

may conveniently be between one and three so that the ratio $$\frac{d''}{d}\times\frac{D}{d'}$$

may be 100 or more. Hence fine adjustments may be made to the position of the cathode 1 by means of coarse movements of the handle 21.

When the desired position of the cathode 1 is obtained the clamping ring 14 may be secured by means of the screws 17, and since a part spherical surface of said clamping ring 14 engages with the spherical outer surface of the actuating member 12 the latter can be firmly fixed in any position, after which the cylindrical member 15 may be removed. Hence the cathode support 5 is supported rigidly at the projecting end and at the diaphragm 7. A suitable cover, as shown dotted may be provided to fix over the clamping ring 14 and so prevent subsequent interference with the adjustment.

In an alternative arrangement shown in FIGURE 2 the cathode 1 is again mounted at one end of a support 5 which is pivotal about its position of contact with the slightly flexible diaphragm 7. As shown in the drawing the support 5 comprises two tubes coupled together but may be in the form of a single rod or tube. An arrangement of a collar 11, actuating member 12 and a bearing surface is provided and is similar to that described with reference to FIGURE 1 with the exception that the spherical inner surface of the actuating member 12 is provided on the outer edge thereof and the collar 11 is arranged to hold said actuating member 12 in the bearing, whilst said member 12 is free to tilt about the axis of the support 5. Thus the necessity for a clamping ring such as the ring 14 shown in FIGURE 1 is avoided. In the present example the bearing surface is provided in the supporting member 9 for the diaphragm 7 but may, as shown in FIGURE 1, be provided in a housing secured to said supporting member 9.

In order to [centre] *center* the cathode 1 with respect to the aperture in the anode 2 the actuating member 12 is tilted as heretofore described with reference to FIGURE 1. In the present example as shown in FIGURE 3 the member 12 is provided with three recesses 24 in place of the annular groove 16, and the adjusting member for the actuating member 12 can be arranged to have three prongs in place of the sleeve 15 adapted to engage in said recesses 24 and to tilt said member 12 as heretofore described. In order to secure the actuating member 12 in position said member which is of ring shape is provided with a transverse split 25 and a screw threaded aperture 26 is provided in the split 25. A tapered screw (not shown) is provided to engage in said aperture such that as said screw is turned to engage in the aperture the split 25 is enlarged and the consequent expansion of the actuating member 12 causes said member to become firmly fixed in position within the bearing.

If desired a cover, as shown dotted, may be provided over the collar 11 and actuating member 12.

The magnetron may be of the kind having a heated cathode or a cold cathode, such as described in copending United States application Serial Number 563,802. Where the cathode 1 is a cold cathode it is preferable that the support 5 should be in the form of a tube in order to accommodate inlet and outlet tubes for a cooling fluid. As shown in FIGURES 2 and 3 apertures 27 can be provided in the end of the support 5 to accommodate such tubes.

What we claim is:

1. A magnetron comprising a cathode disposed within an aperture in an anode, wherein said cathode is mounted at one end of an elongated support, which support is pivotably mounted about a point intermediate its ends and is provided near its end remote from said cathode with a collar having a part spherical outer surface which engages with a complementary spherical inner surface of an actuating member having a part spherical outer surface engaging a complementary surface in a bearing and wherein the [centre] *center* of curvature of the outer surface of said actuating member is not coincident with the [centre] *center* of curvature of the outer surface of said collar so that tilting of said actuating member with respect to the axis of said cathode support causes pivotal movement of said support thus enabling said cathode to be [centred] *centered* with respect to said aperture.

2. A magnetron according to claim 1 wherein said actuating member is maintained in said bearing by means of a clamping ring which can be arranged to be in loose contact with said actuating member whilst said actuating member is being tilted and can firmly engage with said actuating member when said cathode is centered with respect to said aperture so as to maintain said actuating member in a fixed position within said bearing.

3. A magnetron according to claim 1 wherein said actuating member is maintained in said bearing by means of said collar.

4. A magnetron according to claim 3 wherein said actuating member is in the form of a ring having a transverse split therein and is provided with a screw threaded aperture in said split and a tapered screw is provided, engaging in said screw threaded aperture when said cathode is centered with respect to the aperture in said anode so as to expand said split and fix said actuating member in position within said bearing.

5. A magnetron comprising a cathode disposed within an aperture in an anode, wherein said cathode is mounted at one end of an elongated support, which support is pivotably mounted about a point intermediate its ends and is provided near its end remote from said cathode with a collar having a part spherical outer surface which engages with a complementary spherical inner surface of an actuating member having a part spherical outer surface engaging a complementary surface in a bearing, and said actuating member is provided with an annular groove adapted to be engaged by a sleeve whereby said actuating member can be tilted with respect to the axis of said cathode support, and wherein the [centre] *center* of curvature of the outer surface of said actuating member is not coincident with the [centre] *center* of curvature of the outer surface of said collar so that said tilting of said actuating member causes pivotal movement of said support, thus enabling said cathode to be centered with respect to said aperture.

6. A magnetron comprising a cathode disposed within an aperture in an anode, wherein said cathode is mounted at one end of an elongated support, which support is pivotably mounted about a point intermediate its ends and is provided near its end remote from said cathode with a collar having a part spherical outer surface which engages with a complementary spherical inner surface of an actuating member having a part spherical outer surface engaging a complementary surface in a bearing, and said actuating member is provided with a plurality of recesses therein spaced around said member which recesses are adapted to be engaged by prongs of an adjusting member whereby said actuating member can be tilted with respect to the axis of said cathode support, and wherein the [centre] *center* of curvature of the outer surface of said actuating member is not coincident with the [centre] *center* of curvature of the outer surface of said collar so that said tilting of said actuating member causes pivotal movement of said support thus enabling said cathode to be centered with respect to said aperture.

7. A magnetron comprising a cathode disposed within an aperture in an anode, wherein said cathode is mounted at one end of an elongated support, which support is pivotably mounted about a point intermediate its ends in a diaphragm, and is provided near its end remote from said cathode with a collar having a part spherical outer surface which engages with a complementary spherical inner surface of an actuating member having a part spherical outer surface engaging a complementary surface in a bearing and wherein the [centre] *center* of curvature of the outer surface of said actuating member is not coincident with the [centre] *center* of curvature of the outer surface of said collar so that tilting of said actuating member with respect to the axis of said cathode support causes pivotal movement of said support thus enabling said cathode to be centered with respect to said aperture.

8. A magnetron according to claim 7 in which said diaphragm is coupled to said bearing.

*9. An electron discharge device including at least two electrodes which have to be positioned relative to each other, wherein one of said electrodes is mounted at one end of an elongated support, which support is pivotably mounted about a point intermediate its ends and is provided near its end remote from said one electrode with a bearing part which engages an actuating member, said bearing part and said actuating member being formed to allow said bearing part to roll upon the actuating member about an axis transverse to the long dimension of said elongated support, another bearing part which is engaged by said actuating member, said actuating part and said other bearing part being formed to allow said actuating member to roll upon said other bearing part about an axis parallel to said first mentioned axis, said axes being not coincident so that rolling of said actuating member on said other bearing part causes said first bearing part to roll upon said actuating member, thereby adjusting the relative positions of said electrodes.*

*10. An electron discharge device including at least one apertured electrode and another electrode which has to be positioned relative to the aperture of said apertured electrode, wherein one of said electrodes is mounted at one end of an elongated support, which support is pivotably mounted about a point intermediate its ends and is provided near its end remote from said one electrode with a collar having a part spherical outer surface which engages with a complementary spherical inner surface of an actuating member having a part spherical outer surface engaging a complementary surface in a bearing and wherein the center of curvature of the outer surface of said actuating member is not coincident with the center of curvature of the outer surface of said collar so that tilting of said actuating member with respect to the axis of said support causes pivotal movement of said support thus enabling the relative position of said electrodes to be adjusted.*

*11. An electron discharge device according to claim 9, said actuating member being provided with coupling means to allow an adjusting member to be coupled thereto.*

References Cited in the file of this patent or the original patent

UNITED STATES PATENTS

| | | |
|---|---|---|
| 1,904,392 | Stintzing et al. | Apr. 18, 1933 |
| 2,506,660 | Bruck et al. | May 9, 1950 |